United States Patent
Bach et al.

(10) Patent No.: US 11,106,937 B2
(45) Date of Patent: Aug. 31, 2021

(54) METHOD FOR CREATING POINT CLOUD REPRESENTATIONS

(71) Applicant: LEICA GEOSYSTEMS AG, Heerbrugg (CH)

(72) Inventors: Thomas Bach, Eggersriet (CH); Martina Di Rita, Berneck (CH); Anargyros Martyridis, Altstätten (CH); Kevin Hanson, Widnau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 69 days.

(21) Appl. No.: 16/435,015

(22) Filed: Jun. 7, 2019

(65) Prior Publication Data
US 2020/0387741 A1 Dec. 10, 2020

(51) Int. Cl.
| | | |
|---|---|---|
| G06K 9/00 | (2006.01) | |
| G06K 9/62 | (2006.01) | |
| G06T 7/30 | (2017.01) | |
| B64C 39/02 | (2006.01) | |

(52) U.S. Cl.
CPC .......... *G06K 9/6211* (2013.01); *B64C 39/024* (2013.01); *G06K 9/0063* (2013.01); *G06T 7/30* (2017.01); *B64C 2201/123* (2013.01)

(58) Field of Classification Search
CPC .................................................... G06K 9/6211
See application file for complete search history.

(56) References Cited

U.S. PATENT DOCUMENTS

| | | | | |
|---|---|---|---|---|
| 2015/0347872 A1* | 12/2015 | Taylor | ............... | G06K 9/00637 382/224 |
| 2015/0347875 A1* | 12/2015 | Akiyama | .............. | G06F 3/1285 358/1.15 |
| 2017/0236024 A1* | 8/2017 | Wang | .................. | G06K 9/6221 382/201 |
| 2020/0387741 A1* | 12/2020 | Bach | ....................... | G06T 5/002 |
| 2021/0121244 A1* | 4/2021 | Innanje | .................. | A61B 34/25 |

OTHER PUBLICATIONS

Rosnell et al (NPL "Point Cloud Generation from Aerial Image Data Acquired by a Quadrocopter Type Micro Unmanned Aerial Vehicle and a Digital Still Camera", Sensors 2012, 12, 453-480; doi:10.3390/s120100453, Jan. 4, 2012) (Year: 2012).*

* cited by examiner

*Primary Examiner* — Oneal R Mistry
(74) *Attorney, Agent, or Firm* — Maschoff Brennan

(57) ABSTRACT

A method for creating point cloud representations for a point cloud generated based on images, wherein the method comprises receiving a point cloud generated based on images, retrieving, from a user, selection criterion information, wherein the selection criterion information is related to the quality information comprised by the points of the point cloud, and filtering the generated point cloud and creating a filtered-point-cloud representation to be displayed while leaving volume and substance of the generated point cloud unchanged, wherein for each point of the point cloud its quality information is compared with the retrieved selection criterion information and only those points of the point cloud are used for the creation of the filtered-point-cloud representation to be displayed, which have a quality information fulfilling the retrieved selection criterion information, and displaying the filtered-point-cloud representation to the user.

20 Claims, 1 Drawing Sheet

METHOD FOR CREATING POINT CLOUD REPRESENTATIONS

FIELD OF THE INVENTION

The present invention relates to a method and a computer program product for creating point cloud representations.

BACKGROUND

For instance, digital models such as e.g. digital surface models (DSM), digital elevation models (DEM), digital terrestrial models (DTM), or other vector-based or mashed models, and/or orthophotos, are commonly used to display point clouds (PC) representing landscapes and urban areas. The point clouds are generated from raw data comprising images. The quality of displayed digital models depends on the quality of the point cloud. If the level of detail and/or abstraction and/or resolution of a displayed digital model is not satisfactory, then a new point cloud has to be generated from raw data wherein at the time of generating the point cloud some points deducible from raw data are not added to the point cloud. The selection of points to be generated and used or to be omitted is based on raw data information related to the accuracy of the corresponding point. A point is only added to the new point cloud if its quality information is in a predefined range.

A generated new point cloud can be display in the form of a digital model. If the displayed surface model is not satisfactory, then the predefined range of the necessary quality information has to be changed and a further point cloud has to be generated from raw data thereby using the changed predefined range of the necessary quality information.

BRIEF SUMMARY

It is therefore an aspect of the present invention to improve the method for creating optimized point cloud representations. It is a further aspect of the invention to generally improve the efficiency of finding a surface model showing desired information.

Another aspect of the invention is to use effective selection criterion.

The invention relates to a method for creating point cloud representations for a point cloud generated based on images captured by a camera as captured images. The method comprises receiving (or importing) raw data comprising the captured images, in particular and position data and/or orientation data related to the capture of the images, generating the point cloud based on the captured images, in particular and position data and/or orientation data, wherein each point of the point cloud comprises
coordinate information defining its position in a coordinate system as well as
quality information relating to the coordinate information, the quality information including at least a first parameter and a second parameter, the first parameter relating to a variance or deviation regarding position calculation for each point, the second parameter relating to a number of captured images used for position calculation for each point,
retrieving, from a user, selection criterion information, wherein the selection criterion information is related to the quality information comprised by the points of the point cloud, and
filtering the generated point cloud and creating a filtered-point-cloud representation to be displayed while leaving volume and substance of the generated point cloud unchanged, wherein for each point of the point cloud its quality information is compared with the retrieved selection criterion information and only those points of the point cloud are used for the creation of the filtered-point-cloud representation to be displayed, which have a quality information fulfilling the retrieved selection criterion information, and
displaying the filtered-point-cloud representation to the user.

The captured images mentioned above which can be part of raw data can be captured by a camera mounted to an unmanned aerial vehicle (UAV) like a drone/multicopter.

In other words, the images can be a series of images captured with a camera disposed on an unmanned aerial vehicle (UAV), the images being captured as aerial images with different poses of the camera.

The generation of the point cloud may include a defined algorithm based on the principle of stereo-photogrammetry which uses the series of images and position and orientation data relating to capture of the aerial images, wherein—for a multitude of points—corresponding image points are identified in several images of the series of images and, based on computing poses for said several images using said corresponding image points, in particular using a principle related to forward intersection using said corresponding image points, the point cloud is generated.

Furthermore, the captured aerial images can be processed by use of a Structure-from-Motion-technique (SfM-technique), sometimes also called VSLAM-technique or SfM/VSLAM-evaluation. The SfM-technique/evaluation is performed with a defined algorithm using the series of images (aerial images) and position and/or orientation data gathered for the UAV during its flight and capture of the aerial images. Therein, for a multitude of points on the ground or on objects in the surrounding, corresponding image points are identified in several images of the series of images and, based on computing poses for said several images using said corresponding image points, in particular using a principle related to resection and forward intersection using said corresponding image points, the point cloud is generated.

The SfM-technique may typically comprise a sparse reference point field calculation and a densification process.

The sparse reference point field calculation may comprise building up a sparse reference point field, wherein coordinates of the reference points are derived using said series of images and based on resection and forward intersection done for corresponding image points, and deriving poses for said several images.

The densification process may comprise—based on results of the sparse reference point field calculation—computing the point cloud being a dense point cloud by forward intersection using the series of images and the poses for each image of the series of images, particularly by using a dense matching algorithm.

Furthermore, the first parameter can relate to a variance or deviation regarding position calculation for each point and can indicate the variance or deviation within the forward intersection calculation of each point, i.e. being an intersection value representing the variance or deviation of the intersection of rays used in the coordinate calculation within the forward intersection.

Also, the quality information can comprise a third parameter relating to the quality of the determined poses of the images or the alignment of corresponding image points on the images used for each point within the SfM-technique.

Furthermore, the first parameter can be expressed by a σ value, and retrieving selection criterion information can comprise retrieving at least one σ value defining a boundary of a selecting range with acceptable σ values.

Furthermore, the second parameter can be expressed by the number of images used for position/coordinate calculation for each point, and retrieving selection criterion information can comprise retrieving at least a number of images, wherein the number of images being a minimum of images to be used to calculate the position of each point of the point cloud.

The position and orientation data may comprise at least one of:
- global navigation satellite system (GNSS) data gathered for the UAV,
- inertial measurement unit (IMU) data gathered for the UAV,
- compass data gathered for the UAV,
- barometer data gathered for the UAV,
- speed-over-ground data gathered for the UAV, and
- surveying data gathered with a geodetic surveying instrument surveying a retroreflector mounted to the UAV.

The above described method can further comprise, after the displaying, the steps of
- selecting a filtered-point-cloud representation by a user, and
- generating a digital model on the basis of the filtered point cloud corresponding to the user-selected filtered-point-cloud representation. Thereby the digital model can be one of e.g. a digital surface model (DSM), digital elevation model (DEM), digital terrestrial model (DTM), orthophoto.

The invention also relates to a computer program product for creating point cloud representations, wherein the computer program product is configured to perform the method mentioned above when the computer program product is run on a program-controlled computer.

The point cloud (being an enhanced point cloud due to the addition of quality parameters assigned to each of the points, i.e. in addition to the respective coordinates of that point) is generated from images (which can be comprised by raw data) captured from the ground and/or objects in the surrounding, as well as related position and orientation data for the UAV-flight.

The coordinate information of a point is defining its position in a coordinate system. This coordinate information is based on space intersection of rays (i.e. the virtual rays used within the forward intersection process being port of a stereo-photogrammetry technique/evaluation using several images in which the same object point occurs, and wherefore the corresponding image points for one same object point need to be found/identified). Thus, each of these rays connect a corresponding point in an image (the image being aligned according to a derived pose) with its perspective center, where the object point then is located. Coordinates of the point are calculated by means of equations delivering the best approach to the intersection of the rays for example by least squares matching or cross correlations.

The accuracy of calculated positions/coordinates of points can be different for different points and it depends on several factors. The accuracy of the measurements of image coordinates of the point in both images is depending on camera parameters. The best approach to the intersection of the rays is influencing the accuracy depending on the quality of the intersection of the rays. The number of overlapping images respectively of rays used for the calculation of the best approach to the intersection is also influencing the accuracy. Further influences on the accuracy of calculated coordinates are based on the quality of the alignment of the used images and on the quality of the used camera position and orientation information and therefore for example on the quality of the local data of the global navigation satellite system (GNSS) and on the quality of an inertial measurement unit (IMU). The use of ground control points within the SfM/SLAM-evaluation can increase the accuracy of alignment and position of the used images and thereby of the calculated coordinates of the point.

The enhanced point cloud comprising accuracy information for each point combined with the steps of retrieving selection criterion information and generating a point cloud representation from points of the enhanced point cloud fulfilling the received selection criterion information allows a very effective finding of a filtered point cloud showing a desired (i.e. oculary optimal for a user) compromise between density and noise (→amount of "bad" points) of the point cloud to be used for further processing. If the appearance of the displayed filtered-point-cloud representation is not sufficient (i.e. does not appear to be good in the eyes of a user, e.g. because the noise is still too high or—to the contrary—the density is already too low) it can be amended just by entering amended selection criterion information. There is no need for any calculations of new points from raw data.

After the displaying, i.e. after the user found appropriate selection criterion information that lead to the oculary optimal compromise between density and noise for the user, the user therewith selects a desired filtered-point-cloud representation and then the step as follows can be performed: generating a digital model such as e.g. a digital surface model (DSM), digital elevation model (DEM), digital terrestrial model (DTM), orthophoto on the basis of the filtered point cloud corresponding to the user-selected filtered-point-cloud representation (i.e. corresponding to the user-entered selection criterion information used for that chosen and oculary approved filtered-point-cloud representation).

I.e., the filtered point cloud (i.e. including in-filtered points only of the originally raw-data-generated point cloud, and excluding out-filtered points of the originally raw-data-generated point cloud) will then be considered and used for the step of generating a digital model such as e.g. a digital surface model (DSM), digital elevation model (DEM), digital terrestrial model (DTM), orthophoto of the ground surface and/or a digital model of UAV-camera-captured objects like buildings.

DETAILED DESCRIPTION

Figure 1:
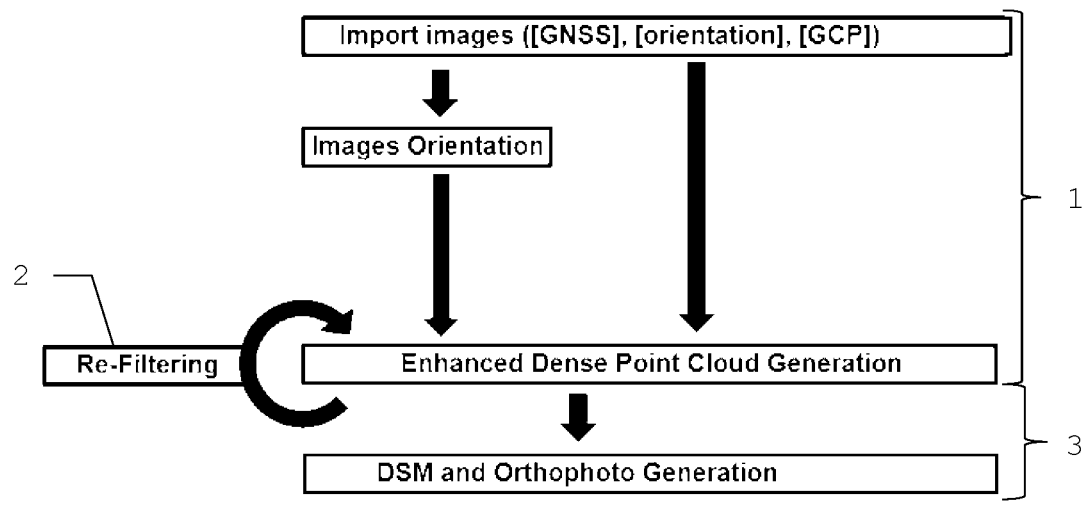
FIG. 1 shows an overview flow chart of the method according to embodiments of the invention.

As shown in FIG. 1, the method for creating point cloud representations for a point cloud generated based on aerial images captured by a camera comprises receiving/importing raw data comprising the captured images, in particular together with position data and/or orientation data related to the capture of the images. This may comprise GNSS data, IMU data, the use of known ground control points (GCP) to derive position and/or orientation for an image relative to these ground control points (as per se generally known to the skilled person), and/or further sensed data like position information for the UAV carrying a retroreflector-target measured by an external surveying instrument (like a theodolite, etc.), and/or a compass and/or a barometer.

A point cloud is then generated based on the captured images. In particular, the position and/or orientation data can also be used for generating and calculating the point cloud. Therein, a SfM technique and/or any other photogrammetry techniques may be applied to generate the point cloud from the images, depending on which and how precise image-external position and/or orientation data being available (like GNSS-, IMU-, GCP-data). The point cloud is generated such that each point of the point cloud comprises coordinate information defining the position of each point of the cloud in a coordinate system as well as quality information relating to the coordinate information, the quality information including at least a first parameter and a second parameter, the first parameter relating to a variance or deviation regarding position calculation for each point, the second parameter relating to a number of captured images used for position calculation for each point.

According to the invention, a user can then input selection criterion information, wherein the selection criterion information is related to the quality information being stored for each point of the point cloud. Particularly, a user can select/input a desired threshold value for the first parameter as well as a desired threshold value for the second parameter.

Then, the generated point cloud is filtered according to the inputted selection criterion information and a filtered-point-cloud representation is created to be displayed while leaving volume and substance of the generated point cloud unchanged. Therein, in the filtering process and the creation process of the filtered-point-cloud-representation, for each point of the point cloud its quality information is compared with the retrieved selection criterion information and only those points of the point cloud are used for the creation of the filtered-point-cloud representation to be displayed, which have a quality information fulfilling the retrieved selection criterion information.

The created filtered-point-cloud representation is then displayed to the user, making it possible for the user to judge whether his choice of the inputted selection criterion information meets his expectations and whether it results in a "filtered" point cloud being appropriate in the opinion of user. E.g., the user can judge if "bad" points or lonely points are still there in the filtered point cloud, or not (and also if the density/coverage of the point cloud is okay in the opinion of the user).

In case the filtered-point-cloud representation is considered to meeting the needs of the user, a confirmation command can be given by the user, so that further processing of the filtered point cloud can begin, e.g. the generation of a vector-based or meshed digital model (like a DSM) and/or an orthophoto. Therein, those points of the original point cloud not corresponding to the inputted filter-criterions (i.e. the user-input selection criterion information) will not be considered for the generation of the digital model or orthophoto, i.e. only the filtered point cloud will be taken into consideration for the generation of the digital model or orthophoto.

In case the filtered-point-cloud representation is considered to not meeting the needs of the user (e.g. because too many bad points like lonely/single points are still there in the filtered point cloud in the opinion of the user), the present invention allows to re-input other selection criterion information than put-in before. Based on the fresh other (newly input) selection criterion information, a further filtering process (re-filtering, see step 2 in FIG. 1) of the original and kept point cloud will be performed (again without doing changes to the original point cloud, i.e. while leaving volume and substance of the generated original point cloud unchanged), and a new filtered-point-cloud representation will be generated, as was done before (but using the newly inputted filter-criterions). This re-filtered point cloud may be judged again by the user with view to usability and quality, and then taken for further process into a DSM.

Hence, according to the invention, several trials can be done by the user, playing with different values for the selection criterion information, without the need to re-calculate the whole point cloud, but just with filtering the existing and already generated point cloud each time (note: filtering may be by far less processing-intensive than re-calculating the whole point cloud from the images according to set quality-criterions).

Figure 2:
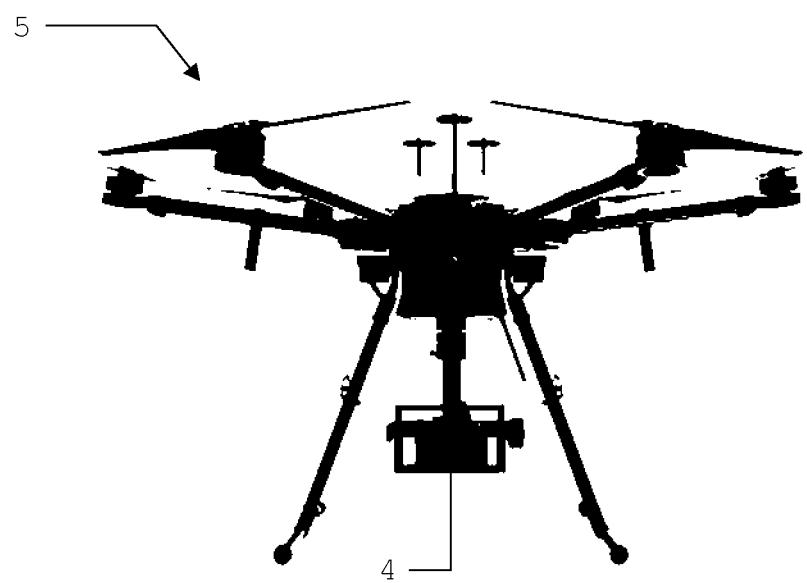
FIG. 2 shows as an example an UAV having a camera for capturing aerial images

FIG. 2 shows as an example an UAV 4 carrying a camera 5 for capturing aerial images. In this example, the UAV has installed an inertial measurement unit (IMU) and carries GNSS-sensors with GNSS-antennas, for continuously measuring position and orientation data.

Thus, according to an embodiment, images can be captured by the camera mounted to the unmanned aerial vehicle (UAV) like a drone/multicopter. In such a case the images are captured as aerial images.

A specific embodiment applies for the calculation of the at least one quality information indicating the accuracy of the coordinate information at least an intersection value representing the quality of the intersection of the rays used for finding the coordinate information.

A further embodiment applies for the calculation of the at least one quality information indicating the accuracy of the coordinate information at least one alignment value representing the quality of the alignment of the used images or of elements on the images.

Another embodiment applies for the calculation of the at least one quality information indicating the accuracy of the coordinate information the number of overlapping images or of rays respectively used for the calculation of the best approach to the intersection.

The accuracy of the coordinates of a point in the point cloud depends on different influences, for example those listed above. At least some influences on the accuracy can be expressed by σ values. In statistics, the standard deviation σ is a measure that is used to quantify the amount of variation or dispersion of a set of data values. A low standard deviation σ indicates that the data points tend to be close to the mean or expected value, while a high standard deviation σ indicates that the data points are spread out over a wider range of values. Therefore, an influence on the accuracy, which has a low σ value for a specific point, indicates that the coordinates of this specific point are calculated with increased precision. Correspondingly a high σ value for a point indicates a low precision of the calculated coordinates of this point.

In a specific embodiment, at least one quality information indicating the accuracy of the coordinate information is expressed by a σ value (i.e. sigma value). Retrieving selection criterion information comprises retrieving at least one σ boundary value defining a boundary of a selecting range with acceptable σ values. Preferably, the selection range includes all σ values that are equal to or smaller than the σ boundary value. A point cloud representation is generated from points of the enhanced point cloud, wherein the selecting range of σ values is applied as selection criterion for points of the enhanced point cloud to be used for the generation of the point cloud representation.

In a further embodiment at least one quality information indicating the accuracy of the coordinate information is expressed by a combined σ value calculated from at least two σ values, wherein the square root of the sum of squares of these at least two σ values is used as the combined σ value.

The accuracy $\sigma_{point(X,Y,Z)}$ of a point with coordinates x,y,z can be presented as a function of two or more major error components, for example an intersection error $\sigma_{isec(X,Y,Z)}$ and a positioning error $\sigma_{pos(X,Y,Z)}$. Therefore $\sigma_{point(X,Y,Z)}$ is a combined σ value. The intersection error depends on the parameters which are used during the calculation of the intersection of at least two rays each connecting a corresponding image point with a perspective center of the specific image. Used parameters comprise camera constant, coordinates of the image points, pixel size, lens distortions, and parameters of external orientation (coordinates of perspective centers and rotations with respect to the reference coordinate system). The positioning error $\sigma_{pos(X,Y,Z)}$ depends on the parameters which are used for finding homologous points in two or more overlapping images. Therefore, the accuracy $\sigma_{pos(X,Y,Z)}$ of a point is the result of error propagation related to the parameters that are involved in the computation of the position of this point.

In a specific embodiment, for each calculated point at least one combined σ value is calculated and stored in the enhanced point cloud assigned to the coordinates of this point. Retrieving selection criterion information comprises retrieving at least one combined σ value defining a boundary of a selecting range with acceptable combined σ values. A point cloud representation is generated from points of the enhanced point cloud, wherein the selecting range of combined σ values is applied as selection criterion for points of the enhanced point cloud to be used for the generation of the point cloud representation.

The accuracy of the coordinate information defining the position of a point increases with the number of images respectively rays used to calculate the coordinates of the point. Therefore, the number of images used to find the coordinate information of the point is also a quality information indicating the accuracy of the coordinate information. The number of images used can be stored in the enhanced point cloud assigned to the coordinates of this point.

In a preferred embodiment of the inventive method, retrieving selection criterion information comprises retrieving filtering-boundaries for a σ value and a number of images. An at least one σ value is defining a boundary of a selecting range with acceptable σ values. A number of images is input as a minimum of images or rays used to calculate the coordinates of a point to be selected. The selecting range of σ values and the minimum number of images is applied as selection criterion for points of the enhanced point cloud to be used for the generation of the point cloud representation.

If the quality of the displayed point cloud representation is not appropriate, then there is no need for recalculating a new point cloud from raw data. After receiving amended (newly-input) selection criterion information, this selection criterion information will be used for re-filtering points out of the enhanced point cloud to be selected for the generation of the filtered (or re-filtered) point cloud representation.

The invention claimed is:

1. A method for creating point cloud representations for a point cloud generated based on images captured by a camera as captured images, comprising:
    receiving raw data comprising the captured images, and position data and/or orientation data related to the capture of the images,
    generating the point cloud based on the captured images, and position data and/or orientation data, wherein each point of the point cloud comprises:
        coordinate information defining its position in a coordinate system; and
        quality information relating to the coordinate information, the quality information including at least a first parameter and a second parameter, the first parameter relating to a variance or deviation regarding position calculation for each point, the second parameter relating to a number of captured images used for position calculation for each point, wherein the quality information indicates an accuracy of the coordinate information;
    retrieving, from a user, selection criterion information, wherein the selection criterion information is related to the quality information comprised by the points of the point cloud, and
    filtering the generated point cloud and creating a filtered-point-cloud representation to be displayed while leaving volume and substance of the generated point cloud unchanged, wherein for each point of the point cloud its quality information is compared with the retrieved selection criterion information and only those points of the point cloud are used for the creation of the filtered-point-cloud representation to be displayed, which have a quality information fulfilling the retrieved selection criterion information, and
    displaying the filtered-point-cloud representation to the user.

2. The method according to claim 1, wherein the images are a series of images captured with a camera disposed on an unmanned aerial vehicle (UAV), the images being captured as aerial images with different poses of the camera.

3. The method according to claim 2, wherein generation of the point cloud includes:
    a defined algorithm based on the principle of stereo-photogrammetry which uses the series of images and position and/or orientation data relating to capture of the aerial images, wherein:
        for a multitude of points, corresponding image points are identified in several images of the series of images and based on computing poses for said several images using said corresponding image points, using a principle related to forward intersection using said corresponding image points.

4. A computer program product having stored non-transitory program code stored in a non-transitory computer readable medium, wherein the computer program product is configured to perform the method of claim 3, when the computer program product is run on a computer.

5. The method according to claim 2, wherein generation of the point cloud includes:
    a structure-from-motion-technique (SfM-technique) that is performed with a defined algorithm using the series of aerial images and position and/or orientation data relating to capture of the aerial images, wherein:
        for a multitude of points, corresponding image points are identified in several images of the series of images and, based on computing poses for said several images using said corresponding image points, in particular using a principle related to resection and forward intersection using said corresponding image points.

6. The method according to claim 5, wherein:
the SfM-technique comprises a sparse reference point field calculation and a densification process,
the sparse reference point field calculation comprises:
building up a sparse reference point field, wherein coordinates of the reference points are derived using said series of images and based on resection and forward intersection done for corresponding image points, and
deriving poses for said several images, and
the densification process comprises:
based on results of the sparse reference point field calculation, computing the point cloud being a dense point cloud by forward intersection using the series of images and the poses for each image of the series of images, using a dense matching algorithm.

7. The method according to claim 6, wherein the first parameter relates to a variance or deviation regarding position calculation for each point and indicates the variance or deviation within the forward intersection calculation of each point, i.e. being an intersection value representing the variance or deviation of the intersection of rays used in the coordinate calculation within the forward intersection.

8. A computer program product having stored non-transitory program code stored in a non-transitory computer readable medium, wherein the computer program product is configured to perform the method of claim 7, when the computer program product is run on a computer.

9. The method according to claim 6, wherein the quality information comprises a third parameter relating to the quality of the determined poses of the images or the alignment of corresponding image points on the images used for each point within the SfM-technique.

10. A computer program product having stored non-transitory program code stored in a non-transitory computer readable medium, wherein the computer program product is configured to perform the method of claim 9, when the computer program product is run on a computer.

11. The method according to claim 5, wherein the quality information comprises a third parameter relating to the quality of the determined poses of the images or the alignment of corresponding image points on the images used for each point within the SfM-technique.

12. A computer program product having stored non-transitory program code stored in a non-transitory computer readable medium, wherein the computer program product is configured to perform the method of claim 11, when the computer program product is run on a computer.

13. A computer program product having stored non-transitory program code stored in a non-transitory computer readable medium, wherein the computer program product is configured to perform the method of claim 5, when the computer program product is run on a computer.

14. A computer program product having stored non-transitory program code stored in a non-transitory computer readable medium, wherein the computer program product is configured to perform the method of claim 6, when the computer program product is run on a computer.

15. The method according to claim 2, wherein the position and/or orientation data comprises at least one of:
global navigation satellite system (GNSS) data gathered for the UAV and/or the camera,
inertial measurement unit (IMU) data gathered for the UAV and/or the camera,
compass data gathered for the UAV and/or the camera,
barometer data gathered for the UAV and/or the camera,
speed-over-ground data gathered for the UAV, and
surveying data gathered with a geodetic surveying instrument surveying a retroreflector mounted to the UAV.

16. A computer program product having stored non-transitory program code stored in a non-transitory computer readable medium, wherein the computer program product is configured to perform the method of claim 2, when the computer program product is run on a computer.

17. The method according to claim 1, wherein:
the first parameter is expressed by a $\sigma$ value, and
retrieving selection criterion information comprises retrieving at least one $\sigma$ value defining a boundary of a selecting range with acceptable $\sigma$ values.

18. The method according to claim 1, wherein:
the second parameter is expressed by the number of images used for position calculation for each point, and
retrieving selection criterion information comprises retrieving at least a number of images, wherein the number of images being a minimum of images to be used to calculate the position of each point of the point cloud.

19. The method according to claim 1, further comprising, after the displaying:
selecting a filtered-point-cloud representation by a user, and
generating at least one of a digital model and an orthophoto on the basis of the filtered point cloud corresponding to the user-selected filtered-point-cloud representation.

20. A computer program product having stored non-transitory program code stored in a non-transitory computer readable medium, wherein the computer program product is configured to perform the method of claim 1, when the computer program product is run on a computer.

* * * * *